B. C. ROCKWELL.
VENEERED FLOORING LUMBER AND METHOD OF MANUFACTURING SAME.
APPLICATION FILED DEC. 20, 1919.
1,394,120. Patented Oct. 18, 1921.
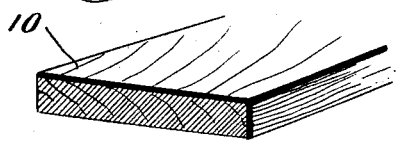
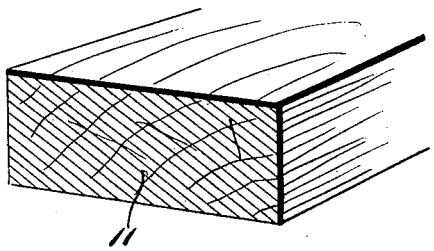
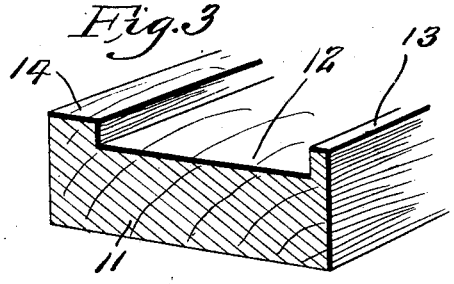
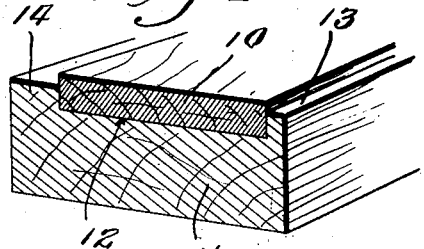
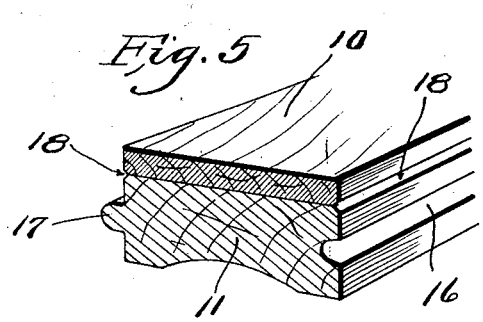
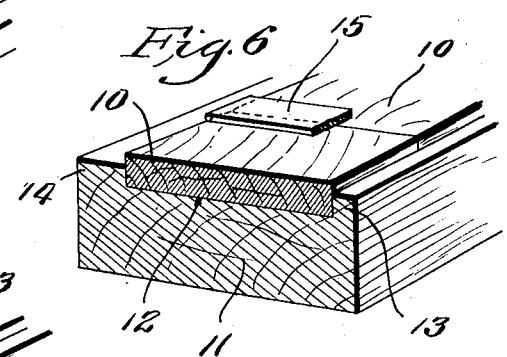
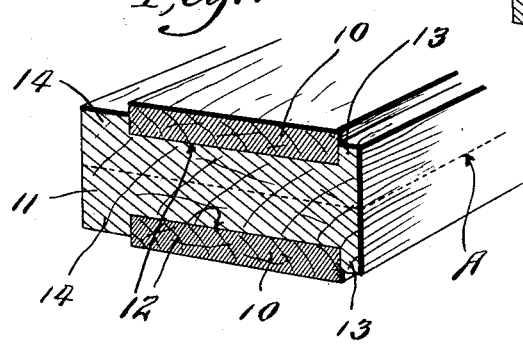
Inventor
Byrd C. Rockwell

UNITED STATES PATENT OFFICE.

BYRD C. ROCKWELL, OF CAMDEN, ARKANSAS.

VENEERED FLOORING-LUMBER AND METHOD OF MANUFACTURING SAME.

1,394,120.  Specification of Letters Patent.  Patented Oct. 18, 1921.

Application filed December 20, 1919. Serial No. 346,404.

*To all whom it may concern:*

Be it known that I, BYRD C. ROCKWELL, a citizen of the United States, residing at Camden, Arkansas, have invented a certain new and useful Improvement in Veneered Flooring-Lumber and Methods of Manufacturing Same, of which the following is a full, clear, and exact description, such as will enable others skilled in the art to which it appertains to make and use the same, reference being had to the accompanying drawings, forming part of this specification.

My invention relates generally to lumber, and more particularly to veneered flooring lumber and the art or method of producing the same, the principal objects of my invention being to manufacture by a relatively simple and easily practised method, flooring lumber and the like, the main body portion of which is composed of relatively cheap material and the face or exposed portion of the lumber being formed of relatively high grade hardwood, such as quarter-sawed oak.

It will be understood that at present it is the generally accepted and standard practice to produce hardwood flooring in strips of the following dimensions; three-eighths, one-half, and seven-eighths inches in thickness; and one and one-half and two inches width of face, and as these strips must be free from damaging imperfections, it is necessary to use practically clear high grade lumber in their manufacture.

While some of the strips are manufactured with straight side edges, the greater portion of the flooring strips are finished with a tongue on one edge and a groove in the opposite edge. These flooring strips are generally manufactured in twelve inch lengths and multiples thereof, but, by virtue of the fact that they must be formed from high grade lumber free from imperfections, the sections as usually manufactured are relatively short. The laying of these relatively short sections involves considerable time, labor and consequent expense, and further, it is a comparatively difficult matter from an average stock of short lengths to match the sections in grain and color.

I propose to overcome the difficulties heretofore existing in the manufacture of high grade flooring lumber by producing through an easily practised and economical method, flooring strips of considerable length, each strip being composed of a back body or core section of relatively cheap low grade lumber, the same carrying on its face one or more sections of relatively thin veneering, the latter being secured to the core by a suitable adhesive such as the well-known weatherproof glue now generally used in the woodworking arts.

My invention consists in the various features hereinafter set forth, pointed out in the claims, and illustrated in the accompanying drawings, in which—

Figure 1 is a perspective view of a short section of the veneering strip which forms the face or upper portion of the flooring lumber contemplated by my invention.

Fig. 2 is a perspective view of a short section of the backing strip or core of the lumber.

Fig. 3 is a perspective view of the backing strip or core after it has been grooved or channeled to receive the veneer section.

Fig. 4 is a perspective view illustrating the veneer section in position upon the core or back section.

Fig. 5 is a perspective view of a short section of veneered flooring constructed in accordance with my invention.

Fig. 6 is a perspective view showing the means employed for securing the abutting ends of a pair of veneer sections.

Fig. 7 is a perspective view of a short section of flooring lumber constructed in accordance with my improved method, and which lumber is constructed so that when properly divided two pieces of flooring lumber will be provided.

In the manufacture of my improved lumber and by my improved methods, I utilize for the veneering or face stock, relatively thin flat strips of high grade hardwood, one of which strips is illustrated in Fig. 1 and designated by the numeral 10.

The core or main body portion of the flooring lumber, a section of which is illustrated in Fig. 2, and designated by the numeral 11, may be formed of any cheap low grade lumber and as none of this core or body portion is exposed on the finished surface of the floor, it need not be entirely free of knots, cracks or other imperfections.

The first step in my improved method consists in the formation of a relatively shallow channel such as 12 in one of the wide flat surfaces of the core stock, the size of said channel being such that the veneer section 10 will fit snugly therein and project slightly above the top of the core stock, as illustrated in Fig. 4. The groove or channel 12 is formed in the core stock so as to leave a relatively narrow upstanding ledge or flange 13 along one edge of said core and a substantially wider ledge or flange 14 along the opposite edge, such arrangement providing the necessary space on one side of the core for the formation of a tongue on the completed piece of flooring lumber.

The ledges or flanges 13 and 14, in addition to retaining the veneer section 10 in position upon the core stock while in the veneer press and during the subsequent steps in the process of manufacture, serve to retain the glue or adhesive that squeezes out from the joint between the members 10 and 11 while the flooring is subjected to pressure in the veneer press. This result insures much better and more permanent joints between the outer edges of the veneer section and core.

In the manufacture of my improved flooring lumber, I prefer to use an adhesive known to the trade as "weather-proof glue" and after such glue has been applied to the undersurface of the veneer strip 10 or to the surface of the groove or channel 12, said veneer strip is positioned in the channel and the assembled parts are subjected to pressure in a veneering press, and after the adhesive has become thoroughly dried, the stock, as illustrated in Fig. 4, is produced.

It will be understood that the core stock can be formed in any desired and convenient lengths, and that relatively short lengths of veneering can be applied to a single core. Where a plurality of sections of veneering are positioned on a single core strip, the ends of the veneering strips are brought together to from a butt joint, as illustrated in Fig. 6, and a short section of adhesive tape such as 15 is applied to the top surfaces of the veneer sections at the butt joint so as to hold the veneer members in position while being prepared for the veneer press.

Under the present practice, the shortest sections used in hardwood flooring are at least twelve inches long but by my improved method of manufacture, I am able to use relatively short or broken veneer sections running in lengths of but a few inches.

After the stock as illustrated in Fig. 4 has been produced it is run through a suitable machine to produce the finished flooring lumber as illustrated in Fig. 5, and in this step in the method of manufacture, a groove 16 is formed in one edge of the core stock and a tongue 17 is formed on the opposite edge. This tongue 17 is formed on the edge of the core stock that is provided with the relatively wide flange or ledge 14.

In order to protect the straight faces of the molder bits or knives used for the finishing cuts on the edges of the material against excessive wear along the glue lines, what is known as "milled cutters" may be used to produce relatively small V-shaped grooves 18 in the edges of the material along the glue lines. These can be readily sharpened as wear of the cutting projections will only affect the depth of their cut, and this is relatively unimportant, as it suffices to locate the edge of the glued joint sufficiently deep beneath the surface or plane of action of the straight edges of the cutters, which operate on the core strip on each side of the tongue or groove, as the case may be, so that said straight edges will not be unduly worn by contact with the glued joint; or these glued-joint grooves can be formed by suitable tools, the same operating immediately in front of the molder bits or knives. These grooves can be formed in any suitable manner, preferably by means of specially formed "milled" rotary cutters or grinders, well known in the art, and just above referred to, but these form no part of my present invention. It is desirable that these glue lines be destroyed or eliminated in connection with or in advance of the finishing bits or knives, as the straight faces of the latter would otherwise wear rapidly at the point where they contact with said glue lines, and as a result, ridges will be formed on the edges of the material, thereby preventing the formation of a perfect joint when the edges of the flooring strips are properly positioned in the floor.

Thus my improved method provides for the production of high grade flooring lumber from relatively thin strips or sections of high grade hardwood combined with relatively cheap and readily obtainable core stock, and which latter when formed in lengths of several feet, will accommodate a plurality of relatively short veneer sections.

Under my improved method of manufacture, veneered flooring stock can be furnished to consumers in any desired lengths and obviously the use of relatively long flooring sections results in economy in the laying of flooring. A further advantage resides in the fact that in manufacturing veneered flooring in the longer and more desirable lengths, the manufacturer is able to carry a larger stock and by selecting color and figure, which can be accomplished at slight expense, he can raise his grades of flooring lumber, and the consumer is able to obtain a floor that is well matched in color and figure.

In the manufacture of relatively thin flooring under my improved methods, the core strips are provided in both top and bottom faces with grooves or channels which receive the veneer sections, and after the stock thus formed has been formed and passed through the veneer press, it is divided along the dotted line A, Fig. 7, after which the side edges of the two sections are run through a suitable machine to finish the side edges and form the tongues and grooves thereupon.

In running the stock through the tongue and grooving machine, it will be noticed that the ledges 13 and 14 provide a finishing surface which is intended to be removed by the cutting or grooving instrumentalities, which form the groove 16, the tongue 17, and the grooves 18, such ledges being entirely cut away down to the edges of the hardwood surface veneer, the wide ledge 14 containing sufficient material to form the tongue 17 on the edge of the low-grade stock, while, of course, the groove 16 is formed in the opposite edge of such low-grade stock. In this manner, none of the high-grade surface veneering, or strip, is cut away or lost in the operation of the finishing devices thereon, and consequently a great saving is thus effected.

I have demonstrated in practice that my improved method of producing hardwood flooring results in a saving of approximately fifty per cent. of high grade lumber in three-eighths inch flooring, and this saving is proportionately greater as the thickness of the flooring increases.

While the foregoing description relates particularly to flooring lumber and the method of its manufacture, it will be readily understood that other flooring as well as lumber for various uses lies within the scope of my invention.

Obviously minor variations in the various steps in my improved method as herein set forth may be resorted to without departing from the spirit of my invention, the scope of which is set forth in the appended claims.

I claim:

1. The hereindescribed method of manufacturing lumber consisting in forming a relatively shallow groove or channel in a core strip, fitting into said groove or channel a veneer strip, uniting said strips by a suitable adhesive, and then finishing the side edges of said strips by removing the ledges of the core on each side of the veneer strip.

2. The hereindescribed method of manufacturing lumber consisting in forming a relatively shallow groove or channel in a core strip and leaving ledges on each side thereof, fitting into said groove or channel a veneer strip, uniting said strips by a suitable adhesive, and then finishing the side edges of said strips to form thereon a tongue and a groove and removing said ledges down to the edges of the veneer strip.

3. The hereindescribed method of producing flooring lumber consisting in forming a shallow channel in the face of a core strip and leaving ledges on each side thereof, arranging in said channel a plurality of relatively short veneer strips, securing said veneer strips to the core strip with a suitable adhesive, and then finishing the side edges of the completed stock by removing the ledges of the core on each side of the veneer strip.

4. The hereindescribed method of manufacturing lumber consisting of forming a relatively shallow groove or chanel in the face of a core strip and leaving ledges of unequal widths on each side thereof, fitting into said groove or channel a veneer strip, and securing the same in position by a suitable adhesive and then finishing the side edges of said core by forming a tongue in the edge having the wide ledge and a groove in the edge having a narrower ledge, said ledges being removed in the operation of forming said tongue and groove.

5. The hereindescribed method of manufacturing tongue and grooved flooring lumber consisting in applying a relatively thin strip of wood to a thicker core strip, uniting said strips by a suitable adhesive, then forming grooves in the side edges of the combined strips along the exposed glue joints, so as to locate said glued joints below the surface to protect the straight edges of the cutters which form the tongue and groove.

6. The hereindescribed method of producing flooring lumber consisting in forming a shallow channel in the face of a core strip, arranging in said channel a plurality of relatively short veneer strips, securing said veneer strips to the core strip with a suitable adhesive, then cutting away the side edges of the core strip down to the edges of the veneer strip, forming grooves in the side edges of the completed stock along the exposed glue joints, and then finishing the side edges of the stock to form thereon a tongue and a groove.

In testimony whereof I hereunto affix my signature this 13 day of December, 1919.

BYRD C. ROCKWELL.